United States Patent
Ortega et al.

(10) Patent No.: US 10,926,691 B1
(45) Date of Patent: Feb. 23, 2021

(54) AIMING APPARATUS FOR HORIZONTAL AIM ADJUSTMENT OF A MOTOR VEHICLE LIGHTING DEVICE WITH A BREAKABLE ADJUSTER

(71) Applicant: Valeo North America, Inc., Troy, MI (US)

(72) Inventors: Amadeus Alfredo Ortega, Troy, MI (US); Julien Hemon, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/718,332

(22) Filed: Dec. 18, 2019

(51) Int. Cl.
*B60Q 1/068* (2006.01)

(52) U.S. Cl.
CPC ............ *B60Q 1/068* (2013.01); *B60Q 1/0683* (2013.01); *B60Q 1/0686* (2013.01); *B60Q 2200/34* (2013.01)

(58) Field of Classification Search
CPC ........ B60Q 1/068; B60Q 1/683; B60Q 1/686; B60Q 2200/34; F41G 1/38; F41G 1/40; F41G 1/545; F41G 1/16; F41G 11/001
See application file for complete search history.

(56) References Cited

U.S. PATENT DOCUMENTS

| | | | |
|---|---|---|---|
| 5,214,971 A | 6/1993 | Burton et al. | |
| 5,497,301 A | 3/1996 | McMahan et al. | |
| 5,735,656 A | 4/1998 | Marvell et al. | |
| 7,284,887 B2 | 10/2007 | Fladhammer | |
| 7,762,686 B2 * | 7/2010 | Fladhammer | B60Q 1/0683 362/273 |
| 8,944,652 B2 | 2/2015 | Tachiiwa | |
| 9,481,290 B2 | 11/2016 | Willeke | |
| 10,023,101 B2 * | 7/2018 | Burton | B60Q 1/0683 |
| 2020/0010013 A1 * | 1/2020 | Herbers | B60Q 1/045 |

* cited by examiner

*Primary Examiner* — Matthew J. Peerce

(74) *Attorney, Agent, or Firm* — Valeo North America, Inc.

(57) ABSTRACT

An aiming apparatus for horizontal aim adjustment of a lighting device of a motor vehicle that uses an adjuster that could be broken at a neck recess portion after the horizontal aim is adjusted, thereby reducing the likelihood of any inadvertent change of the horizontal aim without the need for an additional part to cover a head portion of the adjuster.

14 Claims, 2 Drawing Sheets

AIMING APPARATUS FOR HORIZONTAL AIM ADJUSTMENT OF A MOTOR VEHICLE LIGHTING DEVICE WITH A BREAKABLE ADJUSTER

FIELD OF THE INVENTION

The present invention relates to a lighting device of a motor vehicle, and more particularly to an aiming apparatus for horizontal aim adjustment of a lighting device of a motor vehicle.

BACKGROUND

As required by automotive regulations, the angular aim of the light beam emitted by automotive lighting devices, which corresponds to an optical axis of the lighting device, must be both horizontally and vertically adjusted to produce a desired light distribution that provides sufficient illumination for the driver, while preventing the aiming of the light beam toward oncoming vehicles on the road. The adjustment is performed by means of an aiming apparatus that commonly uses at least one rotatable adjuster—also called aiming screw by the industry's practitioners—that could be accessed and rotated from outside the housing of an automotive lighting device.

In the production chain of the modern automotive industry, there is a division of responsibility for certifying the regulation-compliant aiming of automotive lighting assemblies between manufacturers of automotive lighting devices and automakers. The former is responsible for delivering horizontally aimed lighting devices to the latter, and the latter is responsible for performing the vertical aiming after the lighting devices are mounted on the body of vehicles.

It is desirous and of interest to the manufacturers of automotive lighting devices to reduce the likelihood of any inadvertent change in their certified horizontal aiming, whether by their automaker customers or by future owners or operators of the vehicle. The conventional solution is to put a cover on a head portion of adjuster that sticks out of the housing of lighting devices in order to reduce the ease of access to it.

Among the literature that can pertain to this technology include the following patent documents: U.S. Pat. Nos. 7,284,887; 5,735,656; 9,481,290; 8,944,652; 5,214,971; 5,497,301; German Pat. No. 19,514,994; Japanese Publication 2015/072490, all incorporated herein by reference for all purposes.

SUMMARY OF THE INVENTION

The present invention is directed at a unique solution to one or more of the problems discussed above. It is believed that the present invention provides a more efficient aiming apparatus for adjusting the horizontal aim of automotive lighting devices.

There is contemplated an aiming apparatus of a lighting device of a motor vehicle, comprising: a bracket that carries at least a source of light; a pivot stud with a fixed position relative to the housing of the lighting device that allows the bracket to rotate around the vertical axis; a threaded opening in the housing of the lighting device that is adapted to engage with an adjuster, the adjuster comprising: a head portion that in one aspect of the invention includes an upper head portion adapted to engage with a driver tool as well as a shoulder portion; a neck recess portion; a mating recess portion adapted to provide a seating for an O-ring; a threaded portion adapted to engage with the threaded opening in the housing of the lighting device; and a ball stud portion adapted to engage with the bracket; wherein the rotation of the adjuster around a longitudinal axis causes a linear translation of the adjuster and that in turn causes a pivot of the bracket relative to the housing of the lighting device around the vertical axis, which in turn alters the horizontal aim of the emitted light; and wherein the neck recess portion of the adjuster provides a weaker point for breaking the adjuster and removing the head portion of the adjuster after the horizontal aim of the emitted light bracket has been adjusted to a desired degree.

It is believed that the potential benefit of the present invention over the prior art is the elimination of the need for an additional part to cover the head portion of the adjuster which otherwise would stay outside the housing of the lighting device. Since after the performance of the horizontal aim adjustment, the head portion of the adjuster can be removed, by breaking away the adjuster at the neck recess portion, thereby achieving the goal of preventing any inadvertent change of the horizontal aim.

It is contemplated that the adjuster used for horizontal aiming at the neck recess portion must be strong enough to withstand a torque exerted by a driver tool used in the process of horizontal aiming, yet weak enough to be easily breakable with a radial force exerted manually by a human operator at an endpoint of the head portion. It is contemplated that for an adjuster made of polymer or glass-fibre-reinforced polymer or alloy the optimal tradeoff between breakability and strength is achieved in an adjuster, where the cross section of the adjuster at the neck recess portion has an area that is between 49 to 81 percent of the cross sectional area of the adjuster at the shoulder portion, and the distance between the middle of the neck recess portion and the endpoint of the head portion is between 4 to 5 times the diameter of the shoulder portion.

It is believed that breaking the adjuster used for horizontal aiming is compatible with automotive regulations. While regulations require automotive lighting devices to be vertically aimable throughout their lifetime, to allow for the readjustment of the vertical aim if the need arises, the horizontal aiming is only required to be performed at least once before a vehicle hits the road.

DESCRIPTION OF DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

DETAILED DESCRIPTION OF THE PREFERRED EMBODIMENTS

The present invention provides a more efficient aiming apparatus for adjusting the horizontal aim of automotive lighting devices.

Figure 1:
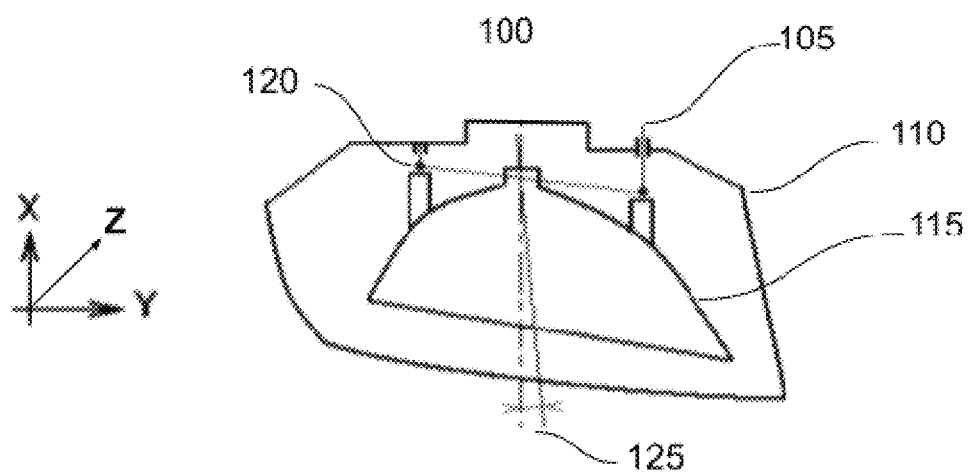
FIG. 1 shows a top view of a conventional aiming apparatus for adjusting the horizontal aim of a lighting device of a motor vehicle.

FIG. 1 schematically shows the top view of a conventional aiming apparatus 100 for horizontal aim adjustment of a lighting device 165 of a motor vehicle 170. The housing 110 of the lighting device provides a threaded opening 185 that engages with the adjuster 105. The adjuster 105 at one end can be engaged with a driver tool outside the housing 110 of the lighting device 165 and at the other end engages with a bracket 115 that carries at least one source of light 180. The bracket 115 engages with a pivot stud 120 that has a fixed position relative to the housing 110. The rotation of the adjuster 105 around its longitudinal axis O-O causes a linear translation 210 of the adjuster 105 relative to the housing 110, which in turn causes the bracket to rotate around the vertical axis Z at the pivot stud 120. The vertical axis Z is the axis normal to the ground and normal to the X-Y plane shown in FIG. 1. The pivot of the bracket 115 around the vertical axis Z produces to a change along the Cross-car Axis Y of the emitted light, which is also known as the horizontal aim 125 of the lighting device 165. The light is emitted in the direction of the Car axis X.

Figure 2:
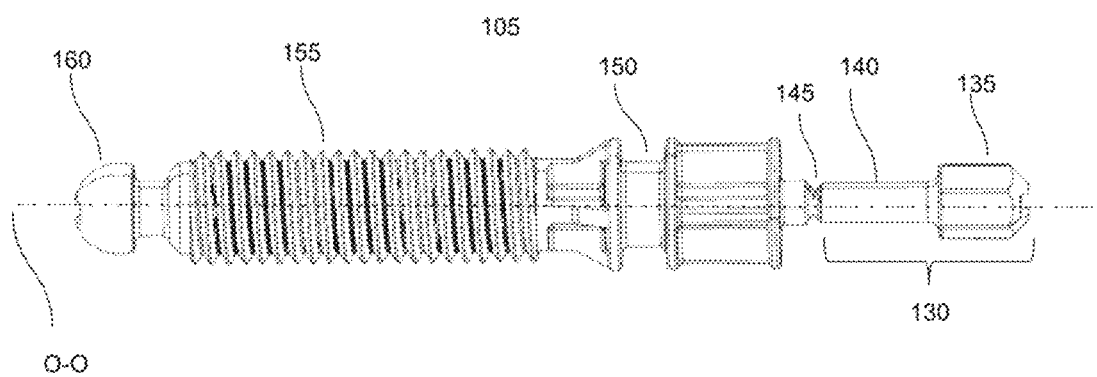
FIG. 2 depicts a side view of the adjuster of the disclosed aiming apparatus.

FIG. 2 exemplarily shows one possible embodiment of the adjuster disclosed herein, comprising a head portion 130, which in this embodiment includes an upper head portion 135 adapted to engage with a driver tool as well as a shoulder portion 140, a neck recess portion 145 that has a cross-sectional area smaller than the cross-sectional area of the shoulder portion 140, a mating recess portion 150 where an O-ring 195 seats to provide sealing for the lighting device 165, a threaded portion 155 that is adapted to engage with a threaded opening 185 in the housing 110 of the lighting device 165, and a ball stud portion 160 that is adapted to engage with the pivotable bracket 115 that carries at least a source of light 180, commonly one or more light emitting diodes (LED).

Once a desired horizontal aim adjustment is achieved, the adjuster 105 is broken at the neck recess portion 145, and the head portion 130 is removed, thereby eliminating the possibility of any inadvertent change of the horizontal aim adjustment without the need to use an additional part to cover the head portion of the adjuster that otherwise would protrude out of the housing of the lighting device.

The adjuster 105 is designed to withstand a torque that it would be subject to during the aiming adjustment operation on the assembly line in the factory, while being easily breakable at the neck recess portion with a radial force exerted manually by a human operator.

Computer simulation has been performed for the preferred embodiment of the disclosed adjuster. It is made of a glass-fibre-reinforced polymer, which can endure 130 Megapascal of stress before breaking. It has a total length of 32.5 millimeters, a shoulder portion with 4 millimeters in diameter, a neck recess portion with 3.2 millimeters in diameter and a distance of 18.3 millimeters between the middle of the neck recess portion and the endpoint of the head portion.

FIG. 2 shows a stress simulation for the preferred embodiment of the adjuster subject to 0.4 Newton-meter of torque. FIG. 2 shows that an operational torque of 0.4 Newton meter would cause the largest von Mises stress at the neck recess portion of about 103 Megapascal. But since that level of stress is still less than the stress at break of 130 Megapascal, the adjuster does not break.

Figure 3:
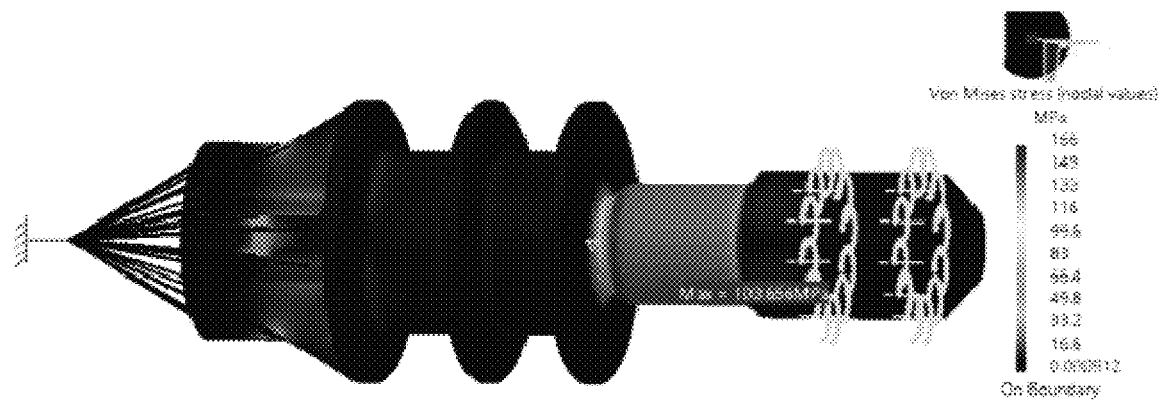
FIG. 3 shows a stress simulation for the disclosed adjuster subject to a torque.
Figure 4:
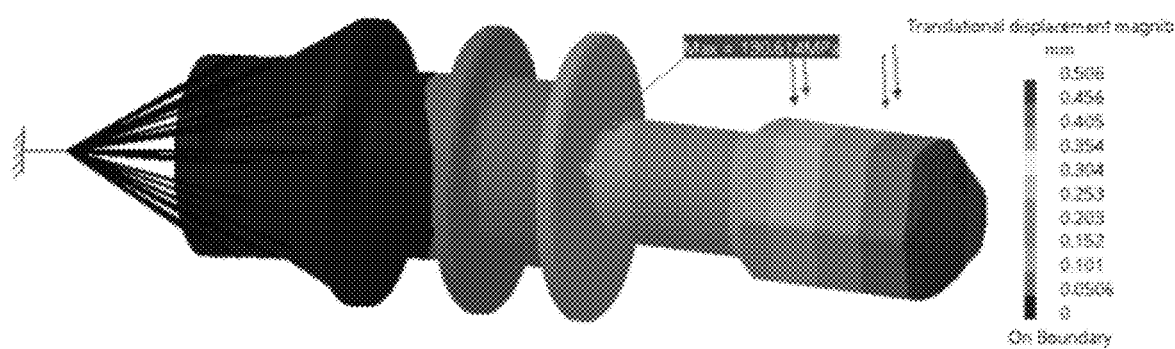
FIG. 4 shows the simulated translational displacement magnitude corresponding to a large enough radial force at the endpoint of the head portion of the adjuster to cause a break at the neck recess portion.

FIG. 3 shows the simulated translational displacement magnitude caused by a large enough radial force to cause a break at the neck recess portion. FIG. 3 shows that a radial force large enough to displace the endpoint of the head portion by about half a millimeter would cause the stress at the neck recess portion to reach the stress at break of 130 Megapascal and therefore would cause a break.

Both the desired ease of breaking by a radial force manually exerted by a human operator and the necessary endurance of the adjuster to a torque exerted by the driver tool are a function of two factors. One factor is the material strength relative to the forces that the adjuster would be subject to, and the other factor is the geometry of the adjuster. It is contemplated that for an adjuster made of a range of polymer, glass-fibre-reinforced polymer or alloy materials that are suitable for this purpose, an optimal size can be reached with a diameter of the neck recess portion 145 that is between 70 to 90 percent of the diameter of the shoulder portion 140 and a distance between the middle of the neck recess portion 145 and the endpoint of the head portion 130 that is between 4 to 5 times the diameter of the shoulder portion 140. The 70 to 90 percent ratio of the diameter of the neck recess portion 145 to the diameter of the shoulder portion 140 corresponds to a ratio of 49 to 81 percent of the area of the cross section of the adjuster at the neck recess portion 145 to the area of the cross section of the adjuster at the shoulder portion 140.

There is contemplated another embodiment of the disclosed invention, in which the upper portion of the adjuster does not have a shoulder portion that is distinguishable from the upper head portion.

In one aspect of the present invention, the cross section of the shoulder portion and/or the upper head portion of the adjuster has the shape of a circle. In yet another aspect of the present invention, the cross section of the upper head portion and/or shoulder portion of the adjuster has the shape of a polygon. There is contemplated another embodiment of the present invention, where the size of the cross section of the head portion varies from the recess neck portion to the end of the head portion.

There is contemplated a method of securing a horizontal aim adjustment of a lighting device of a motor vehicle comprising: providing a bracket that carries at least a source of light; providing a pivot stud with a fixed position relative to a housing of the lighting device that provides a pivot axis around which the bracket can be pivoted in a horizontal direction; providing a threaded opening in the housing of the lighting device that is adapted to engage with an adjuster, the adjuster comprising: a head portion adapted to engage with a driver tool; a neck recess portion; a mating recess portion adapted to provide a seating for an O-ring; a threaded portion adapted to engage with the threaded opening in the housing of the lighting device; and a ball stud portion adapted to engage with the bracket; rotating the adjuster around a longitudinal axis, thereby causing a linear translation of the adjuster, which in turn causes a pivot of the bracket, such that the bracket is horizontally pivoted to produce a desired horizontal aim adjustment of the lighting device; breaking the adjuster at the neck recess portion and removing the head portion, thereby eliminating the possibility of any inadvertent change of the horizontal aim adjustment.

The preferred embodiments of the present invention have been disclosed. A person of ordinary skill in the art would realize however, that certain modifications would come within the teachings of this invention. Therefore, the following claims should be studied to determine the true scope and content of the invention.

LIST OF ELEMENT NUMBERS

Aiming Apparatus 100
Adjuster 105
Housing 110
Bracket 115
Pivot Stud 120
Change in Horizontal Aim as a Result of the Rotation of the Adjuster 125
Head Portion 130
Upper Head Portion 135
Shoulder Portion 140
Neck Recess Portion 145
Mating Recess Portion 150
Threaded Portion 155
Ball Stud Portion 160
Lighting Device 165
Motor Vehicle 170
Source of Light 180
Vertical Axis Z
Cross-car Axis Y
Car Axis X
Threaded Opening 185
Driver Tool 190
O-ring 195
Longitudinal Axis O-O
Adjuster Cross Sectional Area 200
O-ring seat 205
Linear Translation 210

What is claimed is:

1. An aiming apparatus of a lighting device of a motor vehicle, comprising:
    a bracket that carries at least a source of light;
    a pivot stud that allows the bracket to rotate around a vertical axis;
    a threaded opening in the housing of the lighting device that is adapted to engage with an adjuster, the adjuster comprising:
    a head portion adapted to engage with a driver tool;
    a neck recess portion;
    a mating recess portion adapted to provide a seating for an O-ring;
    a threaded portion adapted to engage with the threaded opening in the housing of the lighting device; and
    a ball stud portion adapted to engage with the bracket;
    wherein the rotation of the adjuster around a longitudinal axis causes a linear translation of the adjuster, which in turn causes a pivot of the bracket around the vertical axis and alters a horizontal aim of light emitted from the lighting device;
    wherein the neck recess portion of the adjuster provides a weaker point for breaking the adjuster and removing the head portion of the adjuster after the horizontal aim of the light emitted from the lighting device has been adjusted to a desired degree.

2. An aiming apparatus of claim 1, wherein the head portion of the adjuster comprises an upper head portion and a shoulder portion.

3. An aiming apparatus of claim 1, wherein a cross-sectional area of the adjuster at the neck recess portion has an area that is between 49 to 81 percent of a cross-sectional area of the adjuster at the head portion.

4. An aiming apparatus of claim 1, wherein the distance between the middle of the neck recess portion of the adjuster and an endpoint of the head portion of the adjuster is between 4 to 5 times the diameter of the head portion of the adjuster.

5. An aiming apparatus of claim 2, wherein a cross-sectional area of the adjuster at the neck recess portion is between 49 to 81 percent of a cross-sectional area of the adjuster at the shoulder portion.

6. An aiming apparatus of claim 2, wherein the distance between the middle of the neck recess portion of the adjuster and an endpoint of the head portion of the adjuster is between 4 to 5 times the diameter of the shoulder portion of the adjuster.

7. An aiming apparatus of claim 1, wherein the adjuster is made of glass-fibre-reinforced polymer.

8. An aiming apparatus of claim 1, wherein the adjuster is made of polymer.

9. An aiming apparatus of claim 1, wherein the adjuster is made of alloy.

10. An aiming apparatus of claim 2, wherein the adjuster is made of glass-fibre-reinforced polymer.

11. An aiming apparatus of claim 2, wherein the adjuster is made of polymer.

12. An aiming apparatus of claim 2, wherein the adjuster is made of alloy.

13. An aiming apparatus of claim 2, wherein the head portion of the adjuster is made of alloy.

14. A method of securing a horizontal aim adjustment of a lighting device of a motor vehicle comprising:
    providing a bracket that carries at least a source of light;
    providing a pivot stud that allows the bracket to rotate around a vertical axis;
    providing a threaded opening in the housing of the lighting device that is adapted to engage with an adjuster, the adjuster comprising:
    a head portion adapted to engage with a driver tool;
    a neck recess portion;
    a mating recess portion adapted to provide a seating for an O-ring;
    a threaded portion adapted to engage with the threaded opening in the housing of the lighting device; and
    a ball stud portion adapted to engage with the bracket;
    rotating the adjuster around a longitudinal axis, thereby causing a linear translation of the adjuster, which in turn causes a pivot of the bracket around the vertical axis, to an extent that produces a desired horizontal aim of light emitted from the lighting device;
    breaking the adjuster at the neck recess portion and removing the head portion, thereby eliminating the possibility of any inadvertent change of the horizontal aim.

* * * * *